United States Patent [19]

Ahmed et al.

[11] Patent Number: 4,587,407
[45] Date of Patent: May 6, 1986

[54] SCANNING SYSTEM FOR BAR CODE LABELS AFFIXED TO RODS

[75] Inventors: Hassan J. Ahmed; James L. Fogg, both of Columbia, S.C.

[73] Assignee: Westinghouse Electric Corp., Pittsburgh, Pa.

[21] Appl. No.: 505,670

[22] Filed: Jun. 20, 1983

[51] Int. Cl.4 .............................................. G06K 7/10
[52] U.S. Cl. ..................................... 235/467; 235/465
[58] Field of Search ................. 235/465, 467; 250/566

[56] References Cited

U.S. PATENT DOCUMENTS 4,283,623 8/1981 von Stein ............................ 235/467

Primary Examiner—Harold I. Pitts
Attorney, Agent, or Firm—D. E. Erickson

[57] ABSTRACT

A system for identifying a bar code label affixed to a rod wherein the bar code label including each bar thereof generally circumferentially spans on the rod an angle (the bar code angle) greater than 180° and less than 360° about the rod's longitudinal axis. The system includes a bar code reading optical scanner and a rod positioning mechanism. The scanner has a light beam from a single source and creates two scanning lines which superimposingly intersect at an angle which is greater than 360° minus the bar code angle and which is less than or equal to 180°. The rod positioning mechanism colinearly (or close enough to such) aligns the rod's longitudinal axis with the intersection line of the scanning lines so that the bar code label may be identified independent of the rotational position of the rod about its longitudinal axis.

10 Claims, 7 Drawing Figures

SCANNING SYSTEM FOR BAR CODE LABELS AFFIXED TO RODS

BACKGROUND OF THE INVENTION

The present invention relates generally to a system for reading bar code labels and more particularly to a system for identifying bar code labels affixed to nuclear fuel rods.

Bar code labels are temporarily affixed to nuclear reactor fuel rod cladding tubes. This enables the fuel rods to be easily tracked during various manufacturing and quality control inspection steps. The bar code labels have been read by manually passing a hand-held optical bar code reader across the bar code portion of the bar code label, longitudinally along the tube.

The bar code labels are wrapped only partially around the cladding tube leaving a space on the tube which facilitates later removal of the bar code label. Also, the bar code label may contain an alphanumeric coded portion permitting visual identification of the tube, as well as the bar code portion permitting optical scanner identification. Thus, operators had to manually rotate some of the rods about their longitudinal axes to reveal the bar code portion before manually passing the hand-held reader across the bar code label.

What is needed is an identification system which will automatically position a nuclear fuel rod and read its bar code label regardless of the longitudinal rotational position of its bar code portion.

SUMMARY OF THE INVENTION

Briefly stated, the invention is directed towards a system for identifying a bar code label affixed to a rod. The system includes a bar code reading optical scanner and a rod positioning mechanism. The bar code portion of the bar code label, including each bar thereof, generally circumferentially spans on the rod an angle greater than 180° and less than 360° about the rod's longitudinal axis. The scanner has a light beam from a single source, apparatus for deflecting the beam to produce two diverging scanning lines and apparatus for reflecting the two diverging scanning lines to converge and to generally superimposingly intersect at an angle which is greater than 360° minus the bar code angle and which is less than or equal to 180°. The rod positioning mechanism aligns the rod's longitudinal axis generally coplanar with and parallel to the intersection line of the converging scanning lines. The rod positioning mechanism also moves the rod's longitudinal axis close enough to the intersection line for the converging scanning lines to intercept the rod so as to subtend on the rod an angle about the longitudinal axis which is greater than 360° minus the bar code angle and which is less than or equal to 180°.

BRIEF DESCRIPTION OF THE DRAWINGS

The subject matter of the invention is particularly pointed out and distinctly claimed in the concluding portion of this specification. The invention, however, both as to organization and method of operation, together with further advantages thereof, may best be understood by reference to the following description taken in connection with the accompanying drawings in which:

DETAILED DESCRIPTION OF THE INVENTION

Figure 1:
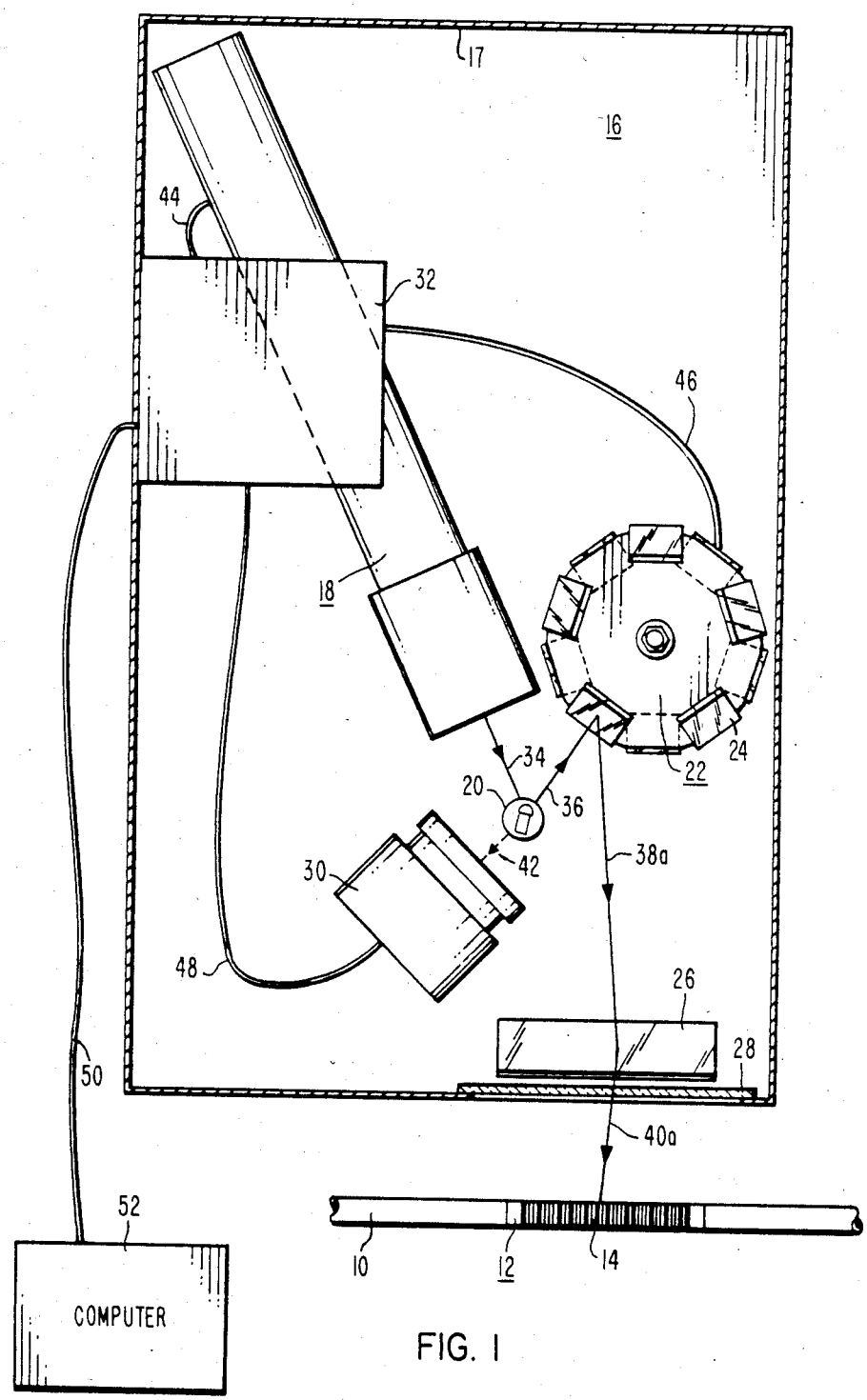
FIG. 1 is a side schematic instantaneous view of the bar code identification system without the rod positioning mechanism.

Reference will now be made in detail to several present preferred embodiments of the invention, an example of which is illustrated in the accompanying drawings. In the drawings, like reference characters designate like or corresponding parts.

The Figures show a system for identifying a bar code label 12 affixed to an elongated rod 10. Preferably the rod 10 is cylindrical, such as a nuclear reactor fuel rod or a cladding tube which has not yet been made into a fuel rod. The bar code portion 14 of the bar code label 12 may contain information such as the individual identification number of the particular rod 10. The bar code label 12 is oriented on the rod 10 such that the bar code portion 14 of the bar code label 12 generally spans an angle (called the bar code angle), about the rod's longitudinal axis, which is greater than 180° and less than 360°, with each of the bars of the bar code portion 14 generally circumferentially wrapping around the rod 10 to generally lie in a separate plane which is generally perpendicular to the rod's longitudinal axis.

Figure 2:
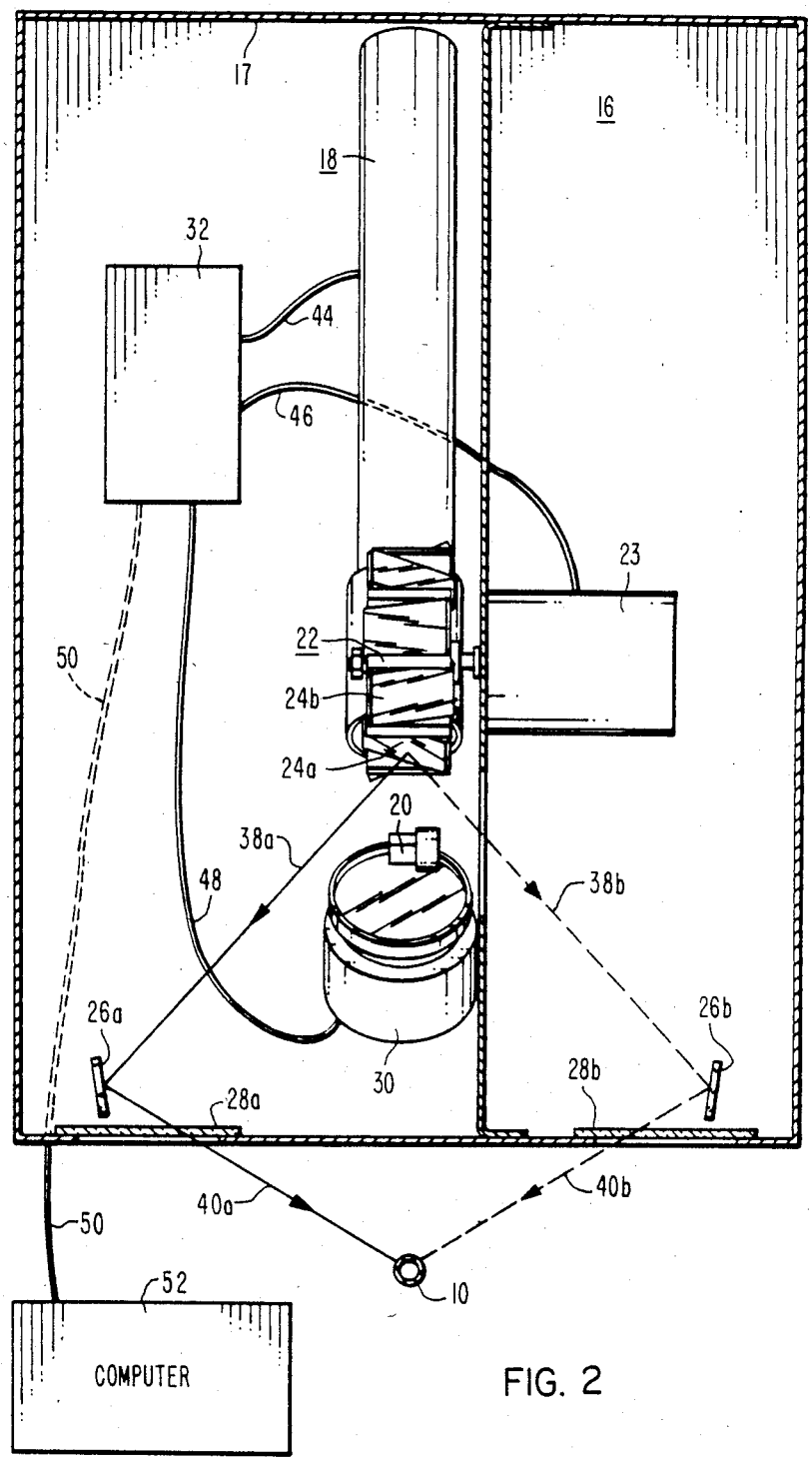
FIG. 2 is a front schematic view of the system of FIG. 1.
Figure 3:
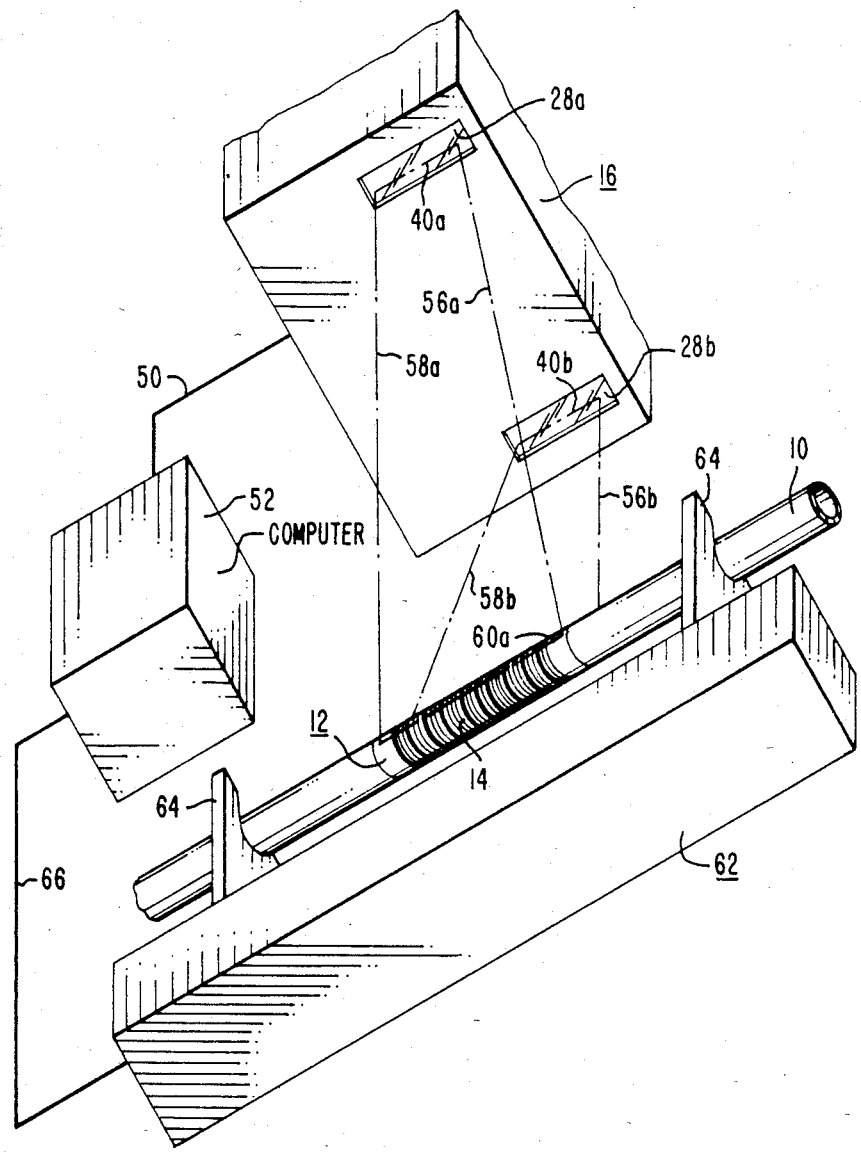
FIG. 3 is a perspective schematic time-averaged view from underneath showing the system of FIG. 1 also including having the rod placed on a weighing scale while its bar code label is read by the scanner.
Figure 4:
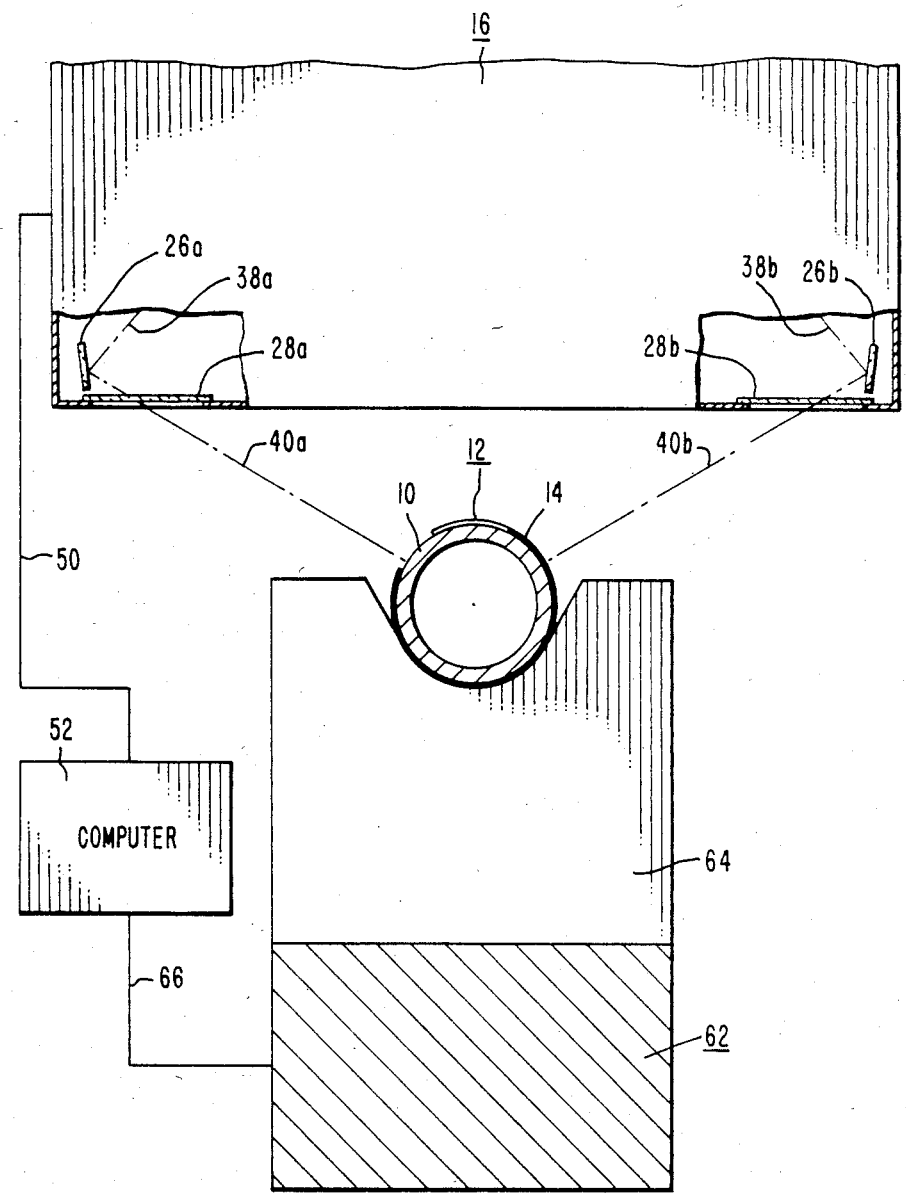
FIG. 4 is a front schematic view of the system of FIG. 3 with portions of the bottom of the scanner cut away.

The system of the invention includes a bar code reading optical scanner 16 (best seen in FIGS. 1 and 2) and means for disposing the rod 10 (seen in FIGS. 5A, 5B, and 5C) which combine to cause two scanning lines 40a and 40b from the scanner 16 to intercept the surface of the rod 10 from opposite sides, so that at least one scanning line will intercept the bar code portion 14 of the bar code label 12 (best seen in FIGS. 3 and 4). The scanner 16 will therefore be able to identify the bar code label 12 independent of the rotational position of the rod 10 about its longitudinal axis.

The scanner 16 is enclosed in a housing 17 and employs a light beam 34 from a single source, such as a laser 18.

Means are provided for deflecting the light beam 34 to produce two diverging scanning lines 38a and 38b. Preferably, such means includes a beam splitter 20 and a modified spindex 22. The beam splitter 20 serves to direct the light beam 34 to the spindex 22 along light beam 36 and to direct the mediately returning light beam from the spindex 22 (after reflection from the bar code label 12) to the optical detector 30 along light beam 42. It is known to use a beam splitter and a standard spindex to produce one scanning line from a laser's light beam. A standard or modified spindex is a wheel turned by a motor 23. The wheel has a plurality of mirrors on its circumference. In a standard spindex, the faces of the mirrors point radially outward from the wheel's center so that a perpendicular to the mirror passing through the mirror's center will be generally coplanar with and perpendicular to the axis of rotation of the spindex. As the wheel turns, a single mirror will produce a single scanning line. Each other mirror, in turn, will repeat the original scanning line. In a modified spindex 22, the faces of the mirrors 24 are alternately tilted at a fixed angle to one or the other side of the wheel so that when the light beam 36 from the beam splitter 20 strikes a first mirror 24a rotating on the modified spindex 22, a first diverging scanning line 38a will be produced which will be diverging from the second diverging scanning line 38b produced by the light beam 36 later striking the second mirror 24b as it rotates on the modified spindex 22 to face the light beam 36. This is an example of deflecting the light beam 34 to produce two diverging and alternating scanning lines 38a and 38b. Other beam deflecting means includes dividing the repeating single scanning line from a standard spindex by a second beam splitter into two non-alternating diverging scanning lines. Another technique would use a beam splitter to divide the laser light beam and then generate non-alternating scanning lines for each divided light beam by conventional means. Alternating diverging scanning lines are preferred to non-alternating ones because of the visual noise problem. By visual noise is meant the condition which occurs when one beam is reading the bar code and the other beam is seeing something else, such as alphanumeric data. The scanner can read a good return alternated in time with a bad return more easily than when the good and bad returns arrive at the same time for decoding. Other beam deflecting means includes intercepting the repeating single scanning line of a standard spindex with a mirror which flip flops between two orientation positions producing alternating diverging scanning lines.

Means are also provided for reflecting the two diverging scanning lines 38a and 38b to converge and to generally colinearly and superimposing intersect, defining a general line of intersection, with the two converging scanning lines 40a and 40b intersecting at an angle greater than 360° minus the bar code angle, and up to 180°. FIG. 1 shows diverging scanning line 38a and converging scanning line 40a at an instant in time (so that the interception line on the surface of the rod 10 would be a traveling point frozen in time as a dot on the bar code portion 14 of the bar code label 12.) FIG. 3 is a time-averaged view, showing an interception line 60a, and also showing converging scanning lines 40a and 40b having, respectively, a top 56a and 56b and a bottom 58a and 58b. It is noted that the two converging scanning lines 40a and 40b intersect each other and define a line of intersection only when a rod 10 is not present. When a rod 10 is present, the two converging scanning lines 40a and 40b intercept the rod's surface defining the two interception lines (such as the one 60a shown in FIG. 3). Preferably, the reflecting means includes a single mirror 26a to reflect diverging scanning line 38a as converging scanning line 40a and a single mirror 26b to reflect diverging scanning line 38b as converging scanning line 40b. Windows 28a and 28b a in the scanner housing 17 transmit the converging scanning lines 40a and 40b outside towards the rod 10. Other reflecting means includes two or more mirrors to be used to redirect each diverging scanning line by steps or stages until the desired converging conditions are achieved. The general line of intersection of the converging scanning lines 40a and 40b with each other may include the intersection of two generally flat arcs without interfering with the reading of the bar codes.

The scanner 16 includes an electronics package 32, known to those skilled in the art, to activate the spindex motor 23 and the laser 18, and to decode the output from the detector 30 to read the bar code being interrogated by either or both scanning lines 40a and 40b striking the rod 10. The electronics package 32 is attached to the motor 23 by a wire 46, to the laser 18 by a cable 44, and to the detector 30 by a lead 48.

The dimensions of the modified spindex 22 including the spindex mirrors 24 are chosen, as can be computed by those skilled in the art, so that together with the mirrors 26, the line of intersection of the converging scanning lines 40a and 40b with each other is greater in length than the width of the bar code portion 14 of the bar code label 12.

The means for disposing the rod 10 are means for disposing the rod to align the rod's longitudinal axis generally coplanar with and generally parallel to the intersection line, to axially position the bar code portion of the bar code label within the axial position of the intersection line, and to transversely position the rod's longitudinal axis sufficiently close to the intersection line for the converging scanning lines to intercept the surface of the rod along intercepting scanning lines (such as intercepting scanning line 60a shown in FIG. 3), with the intercepting scanning lines subtending an angle about the longitudinal axis of greater than 360° minus the bar code angle and up to 180°. Preferably, such rod disposing means simply disposes the rod 10 with its longitudinal axis generally colinear with the intersection line. It is also preferred that the bar code angle be about 270° and the two converging scanning lines 40a and 40b intersect each other at an angle of about 120°.

Figure 5A:
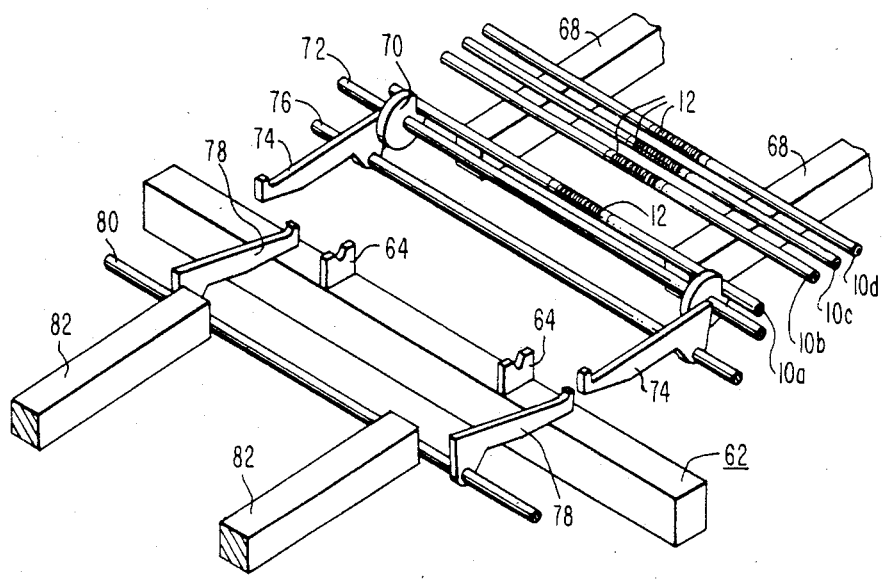
FIGS. 5A, 5B and 5C are perspective schematic views of the rod positioning mechanism in various stages of operation showing how rods are placed in the same position for bar code reading and rod weighing.
Figure 5B:
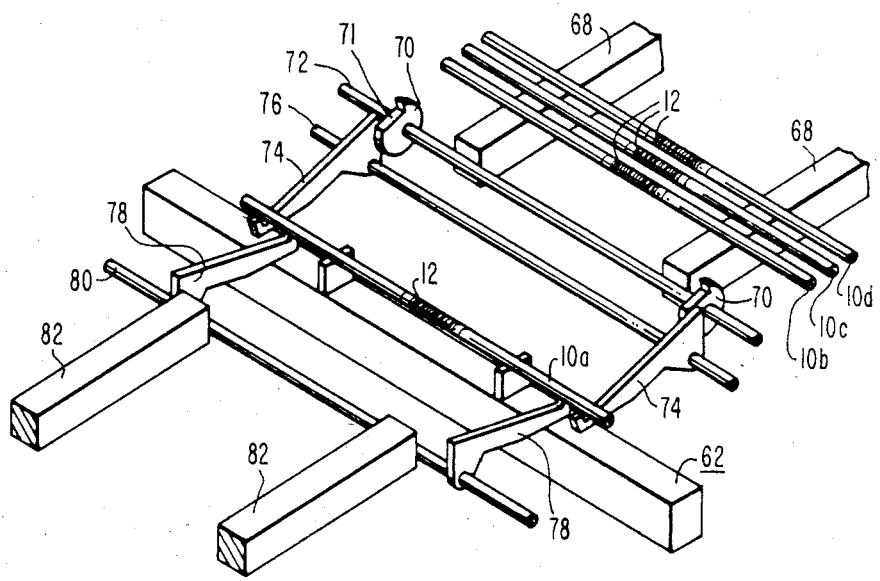
Figure 5C:
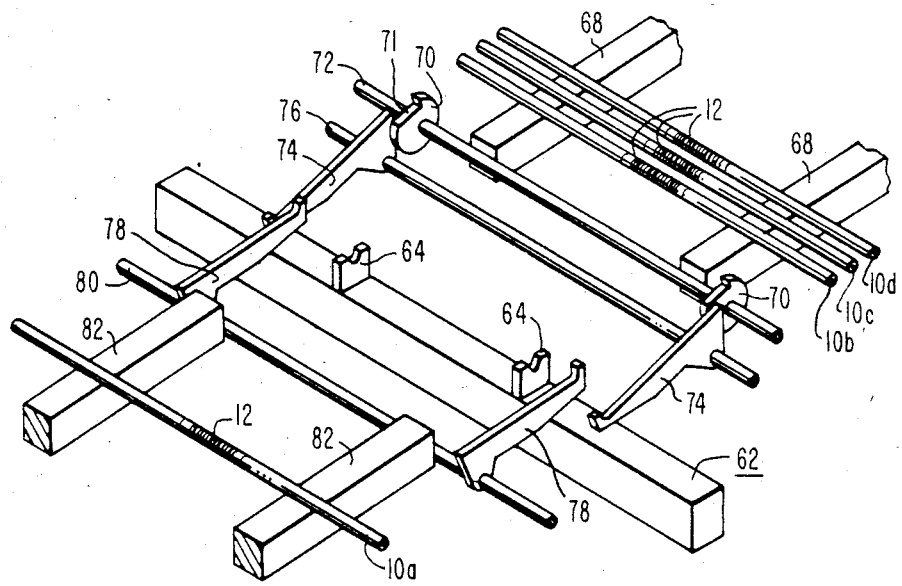

The rod disposing means could be any conventional rod handling equipment, including the use of robots, but preferably, such means includes a loading ramp 68, escapement or loading wheel 70, loading arm 74, rod holder 64, unloading arm 78, and an unloading ramp 82 (as seen in FIGS. 5A, 5B and 5C). The rod holders 64 are fixedly positioned underneath the scanner 16 such that the line of intersection of the converging scanning lines 40a and 40b would be colinear with the longitudinal axis of a rod 10 if placed in the rod holders 64. The rods 10 may be axially positioned manually on the ramp 68 to later be transferred to the rod holders 64 such that the bar code portions 14 are within the axial position of the scanner's intersection line. This result could be accomplished automatically by mechanically pushing one end of the rods against a stop located to the side of the ramp 68, as is known to those skilled in the art. In operation, the axially positioned rods 10 roll down the loading ramp 68. The leading rod 10a fits in a recess 71 of the loading wheels 70. A shaft 72 turns the loading wheels 70 transporting the rod to the loading arms 74. A shaft 76 turns the loading arm 74 lowering the rod 10a to the rod holder 64. The scanner 16 then interrogates the bar code label 12 along the two intercepting scanning lines. After the bar code label 12 is read, a shaft 80 turns the unloading arms 78 raising the rod 10a to the unloading ramp 82. Preferably, the rod disposing means also includes means for weighing the rod 10a when it is in position for reading of its bar code label 12. Preferably, such weighing means includes a scale 62 upon which the rod holders 64 are attached. It is desirable to also have computer means, such as a computer 52, for electronically storing the rod weight from the scale 62 and the rod identification from the scanner 16. The scanner 16 and the scale 62 would be connected to the computer by data links 50 and 66, respectively.

The computer means could also be utilized as a single controller to synchronize the operation of the rod disposing means and the scanner 16 to achieve fully automatic rod weighing and bar code label identification, as can be appreciated by those skilled in the art.

It will be apparent that many modifications and variations are possible in light of the above teachings. It, therefore, is to be understood that within the scope of the appended claims, the invention may be practiced other than as specifically described.

We claim:

1. A system for identifying a bar code label affixed to an elongated rod, wherein each of the bars of said bar code label generally circumferentially wraps around said rod to generally lie in a separate plane generally perpendicular to the longitudinal axis of said rod and wherein the bar code portion of said bar code label generally circumferentially spans an angle about said longitudinal axis, with said bar code angle being greater than 180° and less than 360°, said system comprising:

(a) a bar code reading optical scanner with a light beam from a single source, said scanner having means for deflecting said beam to produce two diverging scanning lines, said scanner also having means for reflecting said two diverging scanning lines to converge and to generally colinearly and superimposingly intersect, defining a general line of intersection, with said two converging scanning lines intersecting at an angle greater than 360° minus said bar code angle and up to 180°, and said line of intersection having a length greater than the width of said bar code portion of said bar code label, and (b) means for disposing said rod to align said longitudinal axis generally colinear with and generally parallel to said intersection line, to axially position said bar code portion of said bar code label within the axial position of said intersection line, and to transversely position said longitudinal axis sufficiently close to said intersection line for said converging scanning lines to intercept the surface of said rod along intercepting scanning lines, with said intercepting scanning lines subtending an angle about said longitudinal axis greater than 360° minus said bar code angle and up to 180°, for said scanner to identify said bar code label independent of the rotational position of said rod about its said longitudinal axis.

2. The system of claim 1, wherein said rod disposing means disposes said rod with said longitudinal axis generally colinear with said intersection line.

3. The system of claim 1, wherein said beam deflecting means produces alternating said diverging scanning lines.

4. The system of claim 1, wherein said rod is generally cylindrical.

5. The system of claim 1, wherein said rod is a nuclear cladding tube.

6. The system of claim 1, wherein said rod is a nuclear fuel rod.

7. The system of claim 1, wherein said bar code angle is generally 270°, said two converging scanning lines intersect at an angle of generally 120°, and said rod disposing means disposes said rod with said longitudinal axis generally colinear with said intersection line.

8. The system of claim 1, wherein said reflecting means consists of two mirrors, one said mirror for each of said two diverging scanning lines.

9. The system of claim 1, wherein said rod disposing means also includes means for weighing said rod when said rod is in position for reading of its said bar code label.

10. The system of claim 9, also including computer means for electronically storing the rod weight from said rod weighing means and the rod identification from said scanner.

* * * * *